United States Patent Office 2,754,334
Patented July 10, 1956

2,754,334
POLYFLUORO ORGANIC SULFIDES

Carl T. Bahner, Jefferson City, Tenn., assignor to The Pennsylvania Salt Manufacturing Company, Philadelphia, Pa., a corporation of Pennsylvania No Drawing. Application March 27, 1953,
Serial No. 344,918

18 Claims. (Cl. 260—609)

This invention relates to polyfluoro organic sulfides and a process for preparing them.

Hanford, in U. S. Patent 2,443,003, teaches that polyfluoro olefins do not react appreciably with mercaptans below 75° C. but that above that temperature a reaction occurs to form a higher molecular weight mercaptan containing one or more units of the fluoroolefin in the carbon chain of the molecule. Hanford's high temperature reaction, he indicates, may be carried out without a catalyst or with any one of a wide variety of catalysts.

I have now found that by reacting a mercaptan with a polyfluoroolefinic compound in which the olefinic linkage is to a terminal $CF_2$ group, at a temperature below 70° C., employing as catalyst an alkaline material, hereinafter defined, addition of the mercaptan to the olefinic bond occurs with cleavage of the mercaptan between sulfur and hydrogen, the thioorganic group adding to the terminal $CF_2$.

By this reaction, a new class of polyfluoro organic sulfides is produced which may be defined by the formula

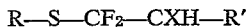

in which R is an organic radical which may be aliphatic (including cycloaliphatic) or aromatic and is attached to the sulfur by a carbon atom that is otherwise unsubstituted except for further linkage to carbon, X is chlorine, fluorine, or other halogen, and R' is hydrogen, a halogen or an aliphatic (including cycloaliphatic) radical. R may be an unsubstituted hydrocarbon radical, saturated or unsaturated, or may contain one or more substituents except on the carbon alpha to the sulfur. Any substituent group except a primary or secondary amino group or a $>C=CF_2$ group may be present; for example hydroxyl, chlorine, fluorine, or other halogen, carbonyl, carboxyl, nitro, sulfonic acid, sulfonyl chloride or fluoride, methoxy, ethoxy, or other alkoxy, phenyloxy or other aryloxy, dimethylamino or other tertiary amino, or similar groups. R' may be an aliphatic (including cycloaliphatic) group, either saturated or unsaturated, and may contain substituents substantially unactive with an olefin linkage, for example, carbonyl, chlorine, fluorine, or other halogen, carboxyl, nitro, sulfonic acid, sulfonyl chloride or fluoride, methoxy, ethoxy, or other alkoxy, dimethylamino or other tertiary amino.

The new class of compounds above defined is a class of organic sulfides that are not only fundamentally different from mercaptans in structure and properties, but contrast also in their properties with the organic sulfides that do not contain the two fluorine atoms on one of the carbon atoms attached to the sulfur. For example, in contrast with the unsubstituted dialkyl sulfides, the sulfur atom in my new class of compounds is surprisingly resistant to attack by bromine and methyl iodide. The products of my invention are useful as solvents, as chemical intermediates, as odoriferous materials, and for other purposes.

As above mentioned, these new products are prepared by reaction of a polyfluoroolefin with a mercaptan in the presence of an alkaline catalyst. The polyfluoroolefin employed in the process of my invention may be represented by the formula

in which X and R' have the meanings defined above. Examples of such olefins include chlorotrifluoroethylene; 1,1-dichloro-2,2-difluoroethylene; trifluoroethylene; 1-chloro-2,2-difluoroethylene; 1-bromo-2,2-difluoroethylene, 1,1,2-trifluoropropylene-1; $CF_2=CFC_2H_4OC_2H_5$;

$$CF_2=CClCH_2COCH_2N(C_2H_5)_2$$

and all other compounds of the formula $CF_2=CXR'$ in which X is chlorine, bromine, iodine, or fluorine, and R' is any one of the groups hereinafter enumerated for this substituent. Any mercaptan may be used in the process of my invention. Illustrative mercaptan reactants are ethyl mercaptan, propyl and isopropyl mercaptans, n-butyl mercaptan, phenyl mercaptan, mercaptoacetic acid, mercaptoethanol, p-mercapto-o-chlorophenol, allyl mercaptan, and all other compounds of the formula RSH in which R is any one of the groups hereinafter enumerated for this substituent.

Examples of R groups that may be present in my mercaptan reactant, RSH, and hence also in my final product $RSCF_2CHXR'$, include methyl, ethyl, propyl, isopropyl, the various butyl groups, the various amyl, hexyl, and higher alkyl groups, phenyl, tolyl, benzyl, and other alkaryl, and aralkyl groups, vinyl, allyl, propenyl, butenyl, propynyl, butynyl, and the higher olefinic and acetylenic hydrocarbon groups, cyclohexyl, cyclohexenyl, groups derived from the pinenes, camphenes, and other cycloaliphatics, hydroxyethyl, hydroxyphenyl, hydroxyvinyl, hydroxycyclohexyl and corresponding hydroxy derivatives of the other hydrocarbon groups above specified, chloroethyl, chlorophenyl, trifluoroethyl, bromophenyl, and corresponding mono and polyhalogen derivatives of the above-named hydrocarbon groups, nitromethyl, nitrophenyl, and corresponding nitro derivatives of the above-specified hydrocarbon groups, —$CH_2CHO$, —$CH_2COCH_3$, and other corresponding aldehydo and keto derivatives of the above-specified hydrocarbon groups, carboxyethyl, carboxyphenyl and other corresponding carboxy derivatives of the above-specified hydrocarbon groups, groups containing esters of any of such carboxy derivatives, e. g., groups such as the above-specified hydrocarbon groups containing substituents of the formula R—O—CO— in which R is as herein defined, ethoxy, phenoxy, other corresponding alkoxy and aryloxy derivatives of the above-specified hydrocarbon groups and other groups containing ether linkages, e. g., groups such as the above-specified hydrocarbon groups containing substituents of the formula R—O— in which R is as herein defined, $HSO_3C_6H_4$—, $FSO_2C_6H_4$—, $ClSO_2C_6H_4$—, and corresponding sulfonic acid and sulfonyl halide derivatives of each of the above-specified hydrocarbon groups, dimethylaminoethyl, diethylaminophenyl, and corresponding tertiary amino derivatives of the above-specified hydrocarbon groups, e. g., groups containing substituents of the formula —$NR_2$ in which R is as herein defined. R may moreover contain more than one of the above-specified hydroxy, halogen, keto, aldehydo, carboxy, ester, nitro, sulfonic acid, sulfonyl halide, ether, or tertiary amino substituents of the same or different nature, e. g., R may be $\gamma$-chloro-$\beta$-hydroxyethyl, 2-carboxy-4-(p-chlorophenoxy)phenyl, and the like. Usually, R will contain no more than about 12 carbon atoms but higher molecular weight aliphatic and aromatic groups are quite suitable for R in the above-specified mercaptan and in the new composition of my invention.

Examples of possible R' groups that may be present in my olefin reactant, $CF_2=CXR'$, and hence also in my final product $RSCF_2CHXR'$, include hydrogen, fluorine, chlorine, bromine, iodine, methyl, ethyl, propyl, isopropyl, the various butyl groups, the various amyl, hexyl, and higher alkyl groups, vinyl, allyl, propenyl, butenyl, ethynyl, propynyl, and the higher olefinic and acetylenic hydrocarbon groups, cyclohexyl, cyclohexenyl, groups derived from the pinenes, camphenes, and other cycloaliphatics, chloroethyl, trifluoromethyl, bromocyclohexyl, and other mono and polyhalogeno derivatives of the above-named hydrocarbon groups, nitromethyl, nitroethyl, and corresponding nitro derivatives of the above-specified hydrocarbon groups, —$CH_2CHO$, —$CH_2COCH_3$, and other corresponding aldehydo and keto derivatives of the above-specified hydrocarbon groups, carboxymethyl, carboxyethyl, and other corresponding carboxy derivatives of the above-specified hydrocarbon groups, groups containing esters of any such carboxy derivatives, e. g., groups such as the above-specified hydrocarbon groups containing substituents of the formula $R'$—O—CO— in which $R'$ is as herein defined (other than halogen), methoxy, ethoxy, other alkoxy derivatives of the above-specified hydrocarbon groups and other groups containing ether linkages, e. g., groups such as the above-specified hydrocarbon groups containing substituents of the formula $R'$—O— in which $R'$ is as herein defined (other than hydrogen or halogen), $HSO_3C_{12}H_{24}$—, $FSO_2C_{10}H_{20}$—, $ClSO_2C_3H_{16}$—, and corresponding sulfonic acid and sulfonyl halide derivatives of each of the above-specified hydrocarbon groups, dimethylaminoethyl, and other tertiary amino derivatives of each of the above-specified hydrocarbon groups, e. g., containing substituents of the formula —$NR'$ in which $R'$ is as herein defined (other than hydrogen or halogen). $R'$ may moreover contain more than one of the above-specified halogen, keto, aldehydo, carboxy, ester, nitro, sulfonic acid, sulfonyl halide, ether, or tertiary amino substituents of the same or different nature, e. g., —chloroacetonyl, (—dimethylaminoethoxy) difluoromethyl, and the like. Usually, $R'$ will contain no more than about 12 carbon atoms but higher molecular weight aliphatic groups are quite suitable for $R'$ in the above-specified olefin and in the new composition of my invention.

The alkaline catalyst used in the process of my invention may be any strong alkali sufficiently soluble in the reaction mixture to make the mixture distinctly basic. This means that when one of the reactants contains an acid functioning substituent group, sufficient alkaline material must be added to neutralize that group and provide the excess required to make the reaction mixture basic. Conversely, if one of the reactants is sufficiently basic to make the reaction mixture basic (e. g., because of a substituent tertiary amino groups or other basic functioning group) this group functions as catalyst and no additional separate catalyst material need be added. Suitable catalysts include quaternary amonium compounds such as benzyl trimethyl ammonium hydroxide, lauryl triethyl ammonium hydroxide, or any of the other quaternary ammonium hydroxides known in the art, tertiary amines such as triethylamine, methyldiethylamine, methylethylisopropylamine, triamylamine, or any of the other tertiary amines known in the art, sodium or other alkali metal alcoholate, sodium or other alkali metal mercaptide, or materials capable of forming the latter in situ, such as metallic sodium, potassium or other alkali metal, or their equivalents such as the alkali metal hydrides, amides or azides, and for some reaction mixtures, the ordinary inorganic strong bases such as sodium hydroxide, potassium hydroxide, lithium hydroxide or their equivalents, when these are sufficiently soluble in the reaction mixture to make it distinctly basic; in general, any base stronger than ammonium hydroxide and soluble in the reaction mixture in sufficient amount to make the reaction mixture distinctly basic.

In a preferred method of carrying out the process of my invention, the catalyst and one of the reactants, for example, the mercaptan, are placed in a reaction vessel and the other reactant is introduced slowly, with cooling, if necessary. A closed container, for example, an autoclave, is preferable to prevent escape of volatile reactants and agitation is desirable to speed the reaction. In most cases, the reaction is started at room temperature and varies from this temperature only to the extent that the heat of reaction or the cooling means raises or lowers the temperature. Since the reaction is often markedly exothermic, cooling means are usually provided. Usually, an excess of olefin is used to insure complete reaction of the mercaptans to avoid the unpleasant odor that would be present if unreacted mercaptan remained. Depending on the particular reactants employed and on the temperature and other conditions, the reaction may be substantially complete within a period ranging from a few hours to several days.

The polyfluoro organic sulfide product is often obtained in reasonably pure condition with little or no purification. But it may be washed with water (being first dissolved in an organic solvent if it is a solid) and dried over anhydrous sodium carbonate. Low pressure distillation can then be employed to obtain a fraction of high purity, for example, distillation in a column packed with glass helices for liquids of relatively low boiling point, or a Hickman alembic molecular still with dry ice in the condensing cone for the very high-boiling liquids. Progress of the distillation is followed by observing the refractive index of the distillate from time to time.

The following examples, in which all parts are by weight, are illustrative of the process and product of my invention.

*Example 1*

Ten parts of a 40% aqueous solution of benzyl trimethyl ammonium hydroxide were mixed with 84.5 parts of ethyl mercaptan in an autoclave and 198 parts of chlorotrifluoroethylene were added. The reaction mixture was agitated by shaking the autoclave and allowed to stand, whereupon the temperature rose from 23.5° C. to about 45° C. during a three-hour period from the heat of reaction. The autoclave was intermittently cooled by indirect heat exchange with cold water and intermittently allowed to stand without cooling, thus maintaining the temperature between about 20 and about 45° C. After about a day's time, the excess chlorotrifluoroethylene was allowed to escape and it was noted that the mercaptan odor was practically absent. After the liquid remaining in the reactor was washed three times with water, it amounted to 234 parts. This product was dried over calcium chloride and distilled at 107 mm. pressure. The very narrow boiling range of the distillation indicated that the colorless, mobile liquid, which has an ethereal odor, was almost pure ethylthiochlorotrifluoroethane.

Although there is a possibility of the formation of two isomers, 1 - ethylthio - 2 - chloro - 1,1,2 - trifluoroethane and 1 - ethylthio - 1 - chloro - 1,2,2, - trifluoroethane, the presence of both isomers was not indicated by the distillation curve of a large quantity, obtained using a seven foot column packed with glass helices. Experimental evidence indicates that only the former compound is formed, namely, that in the sulfide product one of the carbon atoms attached to the sulfur is completely fluorinated, giving the product unusual properties as above mentioned. The 1 - ethylthio - 2 - chloro - 1,1,2 - trifluoroethane product boiled at 69.1° C. at 100 mm., had a refractive index $n_D^{25}$ of 1.4079, and a specific gravity $d_4^{25}$ of 1.3212; in contrast to ordinary alkyl sulfides it did not add bromine in benzene, nor did it form a sulfonium salt on standing thirty days with methyl iodide.

*Example 2*

Two parts of sodium hydride were dissolved in 125 parts of ethyl mercaptan and the reaction with chlorotrifluoroethylene was then carried out as described in Example 1. 278 parts of reaction product were obtained.

*Example 3*

Ten parts of tributylamine, 102 parts of ethyl mercaptan, and an excess of chlorotrifluoroethylene, for reaction with the mercaptan, were reacted for nine days at room temperature, eight hours at 40–60° C., and 12 hours at 60–65° C. Thirty parts of the ethylthiochlorotrifluoroethane product were recovered.

*Example 4*

Similarly, one mol of normal butyl mercaptan was reacted with 1.12 mols of chlorotrifluoroethylene in the presence of .02 mol of benzyltrimethyl ammonium hydroxide at a temperature of 23° C. for 16 hours. A 95% yield of $C_4H_9SCF_2CFClH$ was obtained. The product boiled at 71.6° C. at 25 mm., had a refractive index $n_D^{25}$ of 1.4196, and a specific gravity $d_4^{25}$ of 1.2224.

*Example 5*

In a similar fashion, one mol of normal butyl mercaptan was reacted with 1.13 mols of $CF_2=CCl_2$ in the presence of .02 mol benzyl trimethyl ammonium hydroxide at a temperature of 44° C. for 72 hours to give a 90% yield of $C_4H_9SCF_2CCl_2H$. This product boiled at 43° C. at 1 mm. pressure, had a refractive index $n_D^{25}$ of 1.4545, and a specific gravity $d_4^{25}$ of 1.2707.

*Example 6*

In the same way, one mol of mercapto acetic acid was reacted with 2.38 mols of trifluorochloroethane in the presence of 2.03 mols of triethylamine at a temperature of 45° C. for 23 hours, and the reaction product was distilled at a pressure of .01 mm. up to 85° C., the maximum temperature of the Hickman alembic molecular still. At that point, a 48% recovery of the product $$HOOCCH_2SCF_2CFClH$$

in pure form had been obtained. This material has a melting point of 19° C., a refractive index $n_D^{25}$ of 1.4470 and a specific gravity $d_4^{25}$ of 1.5847.

*Example 7*

One mol of mercaptoethanol was reacted with 2.25 mols of trifluorochloroethylene in the presence of .05 mol of sodium hydroxyethylsulfide at a temperature of 25° C. for 96 hours to give an 87% yield of $HOCH_2CH_2SCF_2CFClH$. This material boiled at 62.5° C. under 0.5 mm. pressure, had a refractive index $n_D^{25}$ of 1.4426, and a specific gravity $d_4^{25}$ of 1.4793.

The mercaptan used in this last example, having both a hydroxy and a mercapto group, provided a means for demonstrating that a thiol adds preferentially over an alcohol to a polyfluoro olefin. When the reaction was carried out with chlorotrifluoroethylene, using the sodium derivative of 2-mercaptoethanol as the catalyst, it was found that the product, obtained in 87% yield, did not have the characteristic thiol odor and did not give a precipitate with silver nitrate, mercuric chloride or lead acetate. These tests show that the formula of the product must be $HOC_2H_4SC_2F_3ClH$ rather than $$HSC_2H_4OC_2F_3ClH$$

Operating as described in the above examples, any of the mercaptans, RSH, as specified in the earlier part of this specification, may be reacted with any of the polyfluoroolefins there described, to make various compounds within the scope of this invention, the following reactions being further illustrative of such reactions and such compounds:

(a) $C_6H_5SH+CF_2=CClCH_3 \rightarrow C_6H_5SCF_2CHClCH_3$
(b) $CH_2=CHCH_2SH+CF_2=CF_2 \rightarrow$
$CH_2=CHCH_2SCF_2CHF_2$
(c) $CH_3SH+CF_2=CBrC_6H_{13} \rightarrow CH_3SCF_2CHBrC_6H_{13}$
(d) $C_{12}H_{25}SH+CF_2=CFCH=CHCH_2SO_3H \rightarrow$
$C_{12}H_{25}SCF_2CHFCH=CHCH_2SO_3H$
(e) $CH\equiv CCH_2SH+CF_2=CFCl \rightarrow$
$CH\equiv CCH_2SCF_2CHFCl$
(f) $F_3C-C_6H_3(SO_2F)-SH+CF_2=CCl_2 \rightarrow$
$F_3C-C_6H_3(SO_2F)-S-CF_2CHCl_2$
(g) $ClF_2C-CO-CH_2SH+CF_2=CFCH_2COOC_6H_5 \rightarrow$
$ClF_2C-CO-CH_2SCF_2CHFCH_2COOC_6H_5$
(h) $(NO_2)C_6H_4-O-CH_2-CH(N(CH_3)_2)CH_2-$
$SH+CF_2=CClC_6H_{11} \rightarrow (NO_2)C_6H_4-O-CH_2-$
$CH(N(CH_3)_2)CH_2-S-CF_2CHClC_6H_{11}$ The term "unsubstituted carbon atom" as used in the claims is intended to denote either a primary, secondary, or tertiary unsubstituted carbon atom; that is, the word "unsubstituted" does not exclude further linkage to carbon.

This application is a continuation-in-part of my copending application Serial No. 179,380 filed August 14, 1950.

Since many modifications are possible in the process of my invention as above described without departure from the scope of the invention, it is intended that the above description of my invention should be interpreted as illustrative, and the invention is not to be limited thereby.

I claim:

1. A composition of the formula $$R-S-CF_2-CXH-R'$$

in which R is an organic radical attached to the sulfur by an unsubstituted carbon atom, X is a halogen, and R' is selected from the group consisting of hydrogen, the halogens, and aliphatic radicals.

2. A composition of the formula $$R-S-CF_2-CXH-R'$$

in which R is an organic radical free of primary and secondary amino groups and of the $>C=CF_2$ group and is attached to the sulfur by an unsubstituted carbon atom, X is a halogen, and R' is selected from the group consisting of hydrogen, the halogens, and aliphatic radicals free of substitutents reactive with an olefin linkage.

3. A composition of the formula $$R-S-CF_2-CXH-R'$$

in which R is an organic radical of not more than 12 carbon atoms attached to the sulfur by an unsubstituted carbon atom, the carbon skeleton of R having attached to it substituents selected from the class consisting of hydrogen, hydroxyl, halogen, carbonyl, carboxyl, nitro, sulfonic acid, sulfonyl halide, ether, ester, and tertiary amino, X is a halogen, and R' is an aliphatic radical of not more than 12 carbon atoms, the carbon skeleton of which has attached to it radicals selected from the group consisting of hydrogen, halogen, carbonyl, carboxyl, nitro, sulfonic acid, sulfonyl halide, ether, ester, and tertiary amino.

4. A composition of the formula $$R-S-CF_2-CXH-R'$$

in which R is an organic radical of not more than 12 carbon atoms attached to the sulfur by an unsubstituted carbon atom, the carbon skeleton of R having attached to it substituents selected from the class consisting of hydrogen, hydroxyl, halogen, carbonyl, carboxyl, nitro, sulfonic acid, sulfonyl halide, ether, ester, and tertiary amino, and X and R' are halogens.

5. A composition of the formula $$R-S-CF_2-CXH-R'$$

in which R is an organic radical of not more than 12 carbon atoms attached to the sulfur by an unsubstituted carbon atom, the carbon skeleton of R having attached to it substituents selected from the class consisting of hydrogen, hydroxyl, halogen, carbonyl, carboxyl, nitro, sulfonic acid, sulfonyl halide, ether, ester, and tertiary amino, X is a halogen, and R' is hydrogen.

6. A composition of the formula R—S—$CF_2$—$CHX_2$ in which R is a saturated aliphatic radical of not more than 6 carbon atoms, free of primary and secondary amino groups, attached to the sulfur through a methylene linkage, and X is a halogen selected from the group consisting of fluorine and chlorine.

7. 1-ethylthio-1,1,2-trifluoro-2-chloroethane.

8. 1-β-hydroxyethylthio-1,1,2-trifluoro-2-chloroethane.

9. 1-n-butylthio-1,1,2-trifluoro-2-chloroethane.

10. 1-n-butylthio-1,1-difluoro-2,2-dichloroethane.

11. 1-carboxymethylthio-1,1,2-trifluoro-2-chloroethane.

12. A method for producing organic sulfides containing a

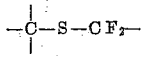

structure that comprises reacting mercaptan free of primary and secondary amino substituents with a polyfluoroolefinic compound containing the structure $CF_2$=CX—, in which X represents halogen, at a temperature below 70° C., employing as catalyst an alkali that makes the reaction mixture basic.

13. A method for producing organic sulfides containing a

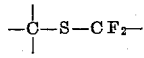

structure that comprises reacting mercaptan free of primary and secondary amino substituents with a polyfluoroolefinic compound of formula $CF_2$=CXR′, at a temperature below 70° C., employing as catalyst a strong alkali soluble in the reaction mixture in sufficient amount to make the reaction mixture basic and selected from the group consisting of quaternary ammonium compounds, tertiary amines, alkali metal alcoholates, alkali metal mercaptides, and alkali metal hydroxides, the X in said formula representing a halogen and the R′ representing a substituent selected from the group consisting of hydrogen, the halogens and aliphatic radicals free of substituents reactive with an olefin linkage.

14. The method of claim 13 in which the catalyst is a quaternary ammonium hydroxide.

15. The method of claim 13 in which the catalyst is a tertiary amine.

16. The method of claim 13 in which the catalyst is an alkali metal mercaptide.

17. The method of claim 13 in which the catalyst is an alkali metal hydroxide.

18. The process of preparing 1-ethylthio-2-chloro-1,1,2-trifluoroethane which comprises reacting ethyl mercaptan with 2-chloro-1,1,2-trifluoroethylene in the presence of benzyltrimethylammonium hydroxide as catalyst at a temperature up to 70° C.

References Cited in the file of this patent

UNITED STATES PATENTS

| | | |
|---|---|---|
| 2,443,003 | Hanford | June 8, 1948 |
| 2,559,754 | Bittles | July 10, 1951 |
| 2,594,935 | Ladd et al. | Apr. 29, 1952 |